United States Patent [19]

Jordan

[11] 3,838,312

[45] Sept. 24, 1974

[54] NON-LINEAR DEFLECTION DRIVE CIRCUIT

[75] Inventor: John D. Jordan, Chesapeake, Va.

[73] Assignee: General Electric Company, Portsmouth, Va.

[22] Filed: Aug. 31, 1971

[21] Appl. No.: 176,470

[52] U.S. Cl. .......... 315/27 TD

[51] Int. Cl. .......... H01j 29/70

[58] Field of Search .......... 315/27 TD, 27 GD, 27 R, 315/26

[56] References Cited

UNITED STATES PATENTS

| | | | |
|---|---|---|---|
| 3,659,141 | 4/1972 | Kubala | 315/27 TD |
| 3,206,634 | 9/1965 | Hellstrom | 315/27 TD |
| 3,221,269 | 1/1965 | Davies | 315/27 TD |
| 2,913,625 | 11/1959 | Finkelstein | 315/27 TD |

*Primary Examiner*—Carl D. Quarforth
*Assistant Examiner*—J. M. Potenza
*Attorney, Agent, or Firm*—W. J. Shanley; Stanley C. Corwin; Frank L. Neuhauser

[57] ABSTRACT

A drive stage for controlling a cathode ray tube deflection circuit. Current output is regulated as a function of voltage appearing across a sweep capacitor. A pair of charging paths are provided for charging the sweep capacitor. A first path is passive and couples the capacitor directly to a source of bias potential, while the second path includes an electron discharge device which modulates the conductivity of the second circuit as a function of drive current. Current from the second path adds increasingly to that from the first path to accelerate the rate at which the sweep capacitor is charged.

12 Claims, 1 Drawing Figure

PATENTED SEP 24 1974
3,838,312
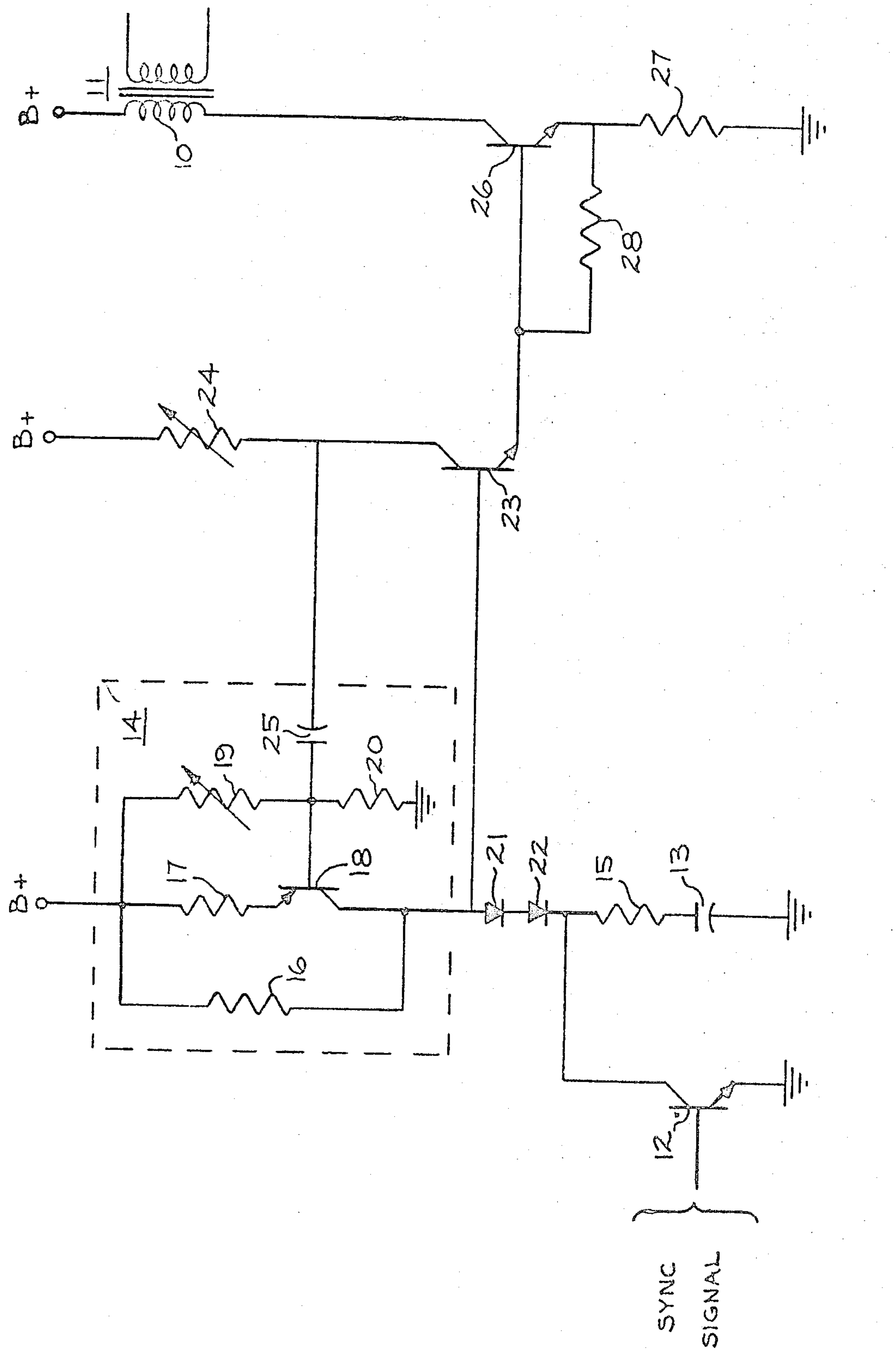

NON-LINEAR DEFLECTION DRIVE CIRCUIT

BACKGROUND OF THE INVENTION

The present invention relates to cathode ray tube deflection circuits and, more particularly, to drive circuitry for producing a control voltage having predetermined non-linear characteristics.

In order to display an image upon the face of a cathode ray tube, it is necessary to periodically scan or deflect a modulated electron beam across the face of the tube. While this may be accomplished by either electrostatic or electromagnetic means, in commercial television receivers electromagnetic deflection means are commonly provided. The current flowing through the windings of the deflection means serves to produce magnetic fields which deflect the electron beam in a desired substantially linear manner. In order to effect the desired linear variation in the mangetic field, a ramp-like control voltage is ordinarily derived from a sweep capacitor. Means are provided to periodically charge the capacitor, the increasing voltage thereacross serving to operate subsequent electronic circuitry for effecting the desired current flow in the deflection means. Often, however, in order to produce an apparently linear scan, it is necessary to apply a non-linear control signal to the deflection circuitry. The non-linearity may be desired in order to compensate for the characteristics of active circuit elements, of the electromagnetic deflection means, or for other reasons.

Many approaches have been adapted in an attempt to introduce the desired non-linearities into a deflection circuit. Complex systems for charging the sweep capacitor have been devised, combining or compounding intricate circuits in order to produce the desired characteristics through the use of passive circuit elements. Other, more effective circuits have been constructed utilizing the principles of feedback in order to modulate or modify the voltage across the sweep capacitor. In many instances, however, the characteristics of the circuit were substantially determined by the parameters of the elements therein, and proper adjustment was often difficult.

It will therefore be recognized that it would be desirable to provide an improved, easily adjustable deflection drive circuit for modifying the charging rate of a sweep capacitor in a predetermined manner.

It is therefore an object of the present invention to provide improved means for producing a predetermined, non-linear control voltage for a cathode ray tube deflection means.

It is another object of this invention to provide an improved non-linear sweep drive circuit, with simplified adjustment means.

SUMMARY OF THE INVENTION

Briefly stated, in accordance with one aspect of the invention, the foregoing objects are achieved by providing a two-stage current supply circuit for a ramp generator, which operates as a function of the voltage appearing at one terminal of an electron discharge device. Two current paths are provided to the ramp generator; a first, passive path, and a second path whose conductivity is modulated in response to current drawn by subsequent drive circuitry. As voltage outputted by the ramp generator increases, the terminal voltage of the electron dicharge device declines and the second charging path becomes more conductive. An increasing amount of current is thus passed by the second charging path, accelerating the rise of the ramp generator output. Adjustable resistances are provided to control the timing and rate at which current flows through the second path, modifying the height and linearity, respectively, of the resulting deflection signal.

BRIEF DESCRIPTION OF THE DRAWING

While the specification concludes with claims particularly pointing out and distinctly claiming the subject matter which is regarded as the invention, it is believed that the invention will be better understood from the following description of the preferred embodiment taken in conjunction with the accompanying FIGURE which is a schematic drawing of portions of a vertical sweep system utilizing the principles of the present invention.

DESCRIPTION OF THE PREFERRED EMBODIMENT

The FIGURE shows in schematic form a vertical drive system for supplying current to the primary winding 10 of vertical output transformer 11 of a television receiver. Vertical sync signals are abstracted from a detected video signal and applied to the base of switching transistor 12 for periodically discharging a sweep capacitor 13 through serially-connected resistor 15. Charging current for sweep capacitor 13 originates at a suitable source of DC potential, herein denominated B+. As will be understood by those skilled in the art, as capacitor 13 is charged the voltage thereacross rises in a generally linear manner to form a ramp-like waveform. Capacitor 13 thus comprises a simple, inexpensive ramp generator for controlling the activity of subsequent circuitry.

Current is applied to sweep capacitor 13 by way of a current control network generally indicated at 14. Network 14 encompasses two charging circuits; a first, passive circuit which includes resistor 16 and a second, controlled circuit comprising the series combination of resistor 17 and charging transistor 18. Resistors 19 and 20 are series-connected to form a voltage divider lying between a source of B+ and ground and provide a suitable biasing potential to the base terminal of charging transistor 18. Resistor 19 may advantageously be adjustable for allowing the average bias on the base terminal of transistor 18 to be varied. This serves as a height adjustment for the receiver by varying the point in the trace period at which transistor 18 becomes conductive.

A pair of serially-connected diodes 21 and 22 couple resistor 15 and sweep capacitor 13 to the parallel charging circuits. Diodes 21 and 22 support a constant voltage drop thereacross, providing an offset voltage which compensates for the base-to-emitter drops of driver transistor 23 and output transistor 26. A voltage arising at the anode of offset diode 21 is applied to the base terminal of the driver transistor 23, the collector terminal of which is coupled to a source of DC potential by an adjustable resistor 24. The voltage arising at the intersection of adjustable resistor 24 and the collector terminal of transistor 23 is coupled to the base of transistor 18 by means of a feedback capacitor 25. Adjustable resistor 24 serves as a linearity control by varying the voltage drop between the source of DC potential and the collector terminal of driver transistor 23 and thus the rate at which feedback capacitor 25 is charged.

The emitter of transistor 23 is coupled to the base of output transistor 26, which in turn is connected in series between primary winding 10 of output transformer 11, and resistor 27. A biasing resistor 28 is connected between the base and emitter terminals of output transistor 26, and provides a path for current flowing from transistor 23.

In describing the operation of the circuit of the FIGURE, it will initially be assumed that no enabling signal is present at the base terminal of switching transistor 12. Current from the DC potential source traverses only resistor 16, flowing through the forward-biased offset diodes 21 and 22 and through resistor 15 to charge sweep capacitor 13. At this time, the voltage appearing at the andoe of diode 21 is insufficient to cause drive transistor 23 to bias output transistor 26 into conduction. With transistor 23 conducting only slightly, the voltage at the collector terminal thereof approaches a value which is substantially that of the bias voltage. The positive-going voltage thus obtained traverses feedback capacitor 25, and adds to the bias provided by resistors 19 and 20 to maintain charging transistor 18 in a state of non-conduction.

After some predetermined time has elapsed, a sufficient voltage arises across sweep capacitor 13 and offset diodes 21 and 22 to bias driver transistor 23 further into conduction. As transistor 23 conducts harder the voltage at the collector terminal thereof declines. This negative-going voltage is applied through feedback capacitor 25 to the base terminal of charging transistor 18, causing the transistor to commence conduction. Additional current now flows through resistor 17 and charging transistor 18 which, when added to the current already flowing through resistor 16, increases the rate at which sweep capacitor 13 is charged. The increased rate at which voltage appears across sweep capacitor 13 is reflected by an increase in conductivity of driver transistor 23 which in turn draws still more current, driving charging transistor 18 further into conduction.

The positive or regenerative feedback thus effected continues to accelerate the rate of charge of sweep capacitor 13 to produce a generally parabolic voltage increase thereacross. The state of conduction of driver transistor 23 is reflected in the current passed by output transistor 26. As driver transistor 23 is forward-biased by sweep capacitor 13, the increasing current passed thereby serves to bias output transistor 26 in a manner which substantially reflects the non-linear charging rate of the sweep capacitor.

After a predetermined period of time has elapsed, an enabling signal, which for the circuit disclosed would be a positive-going pulse, is applied to the base terminal of switching transistor 12. When transistor 12 is thus enabled it provides a low impedance path through which sweep capacitor 13 is rapidly discharged to institute a retrace of the deflection system. The rapidly lowered voltage appearing at the anode of offset diode 21 causes the conductivity of driver transistor 23 to decline substantially. Feedback capacitor 25 immediately begins to charge through adjustable resistor 24, disabling charging transistor 18. Output transistor 26 now abruptly ceases to conduct current, causing a retrace pulse in the windings of vertical output transformer 11. When the enabling signal terminates, switching transistor 12 again becomes nonconductive, allowing sweep capacitor 13 to commence charging once more.

It will now be understood that the circuit of FIG. 1 provides means for increasing the charging rate of a sweep capacitor in a non-linear fashion through the use of regenerative feedback to control an auxiliary charging path. It will further be appreciated that the resulting increased slope of the final scan signal occurs principally during the latter portion of the trace period, the slope of the initial portion of the scan signal remaining substantially linear as determined by the relative values of sweep capacitor 13 and resistors 15 and 16.

While it will be understood that the values of the various circuit components may be varied to suit a particular application, the following values of circuit components are given by way of example:

| | |
|---|---|
| Resistors: | |
| **15** | 330 ohms |
| **16** | 250 kilohoms |
| **17** | 10 kilohms |
| **19** | 10 kilohms |
| **20** | 100 kilohms |
| **24** | 1 kilohms |
| **27** | 47 ohms |
| **28** | 220 ohms |
| Diodes: | |
| **21** | IN 914 |
| **22** | IN 914 |
| Capacitors: | |
| **13** | 0.15 microfarads |
| **25** | 2 microfarads |
| Transistors: | |
| **12** | Type 16 E (General Electric) |
| **18** | Type D 29 A (General Electric) |
| **23** | Type 16 E (General Electric) |
| **26** | MJE 340 (Motorola) |

It will now be recognized that the invention embodied in the above-described circuit comprises an improved deflection drive circuit which introduces desired modifications into a sweep signal, and which further may easily be adjusted to provide the proper degree of correction.

As will be evident from the foregoing description, certain aspects of the invention are not limited to the particular details of construction of the examples illustrated, and it is therefore contemplated that other modifications or applications will occur to those skilled in the art. It is accordingly intended that the appended claims shall encompass all such modifications and applications as do not depart from the true spirit and scope of the invention.

What is claimed as new and desired to be secured by Letters Patent of the United States is:

1. Circuit means for operating cathode ray tube deflection means, comprising:

a first electronic means adapted to control current flow through the deflection means;

ramp generator means coupled to said first electronic means for periodically modifying the conductivity of said first electronic means;

first means to couple said ramp generator means to a source of bias potential;

second means to couple said ramp generator means to a source of bias potential including a second electronic means having a control terminal for regulating current flow through said second means; and means coupling the control terminal of said second electronic means to said first electronic means for causing said second electronic means to operate in response to current flowing through said first electronic means.

2. Circuit means for operating cathode ray tube deflection means, comprising:

first means adapted to control current flow through the deflection means;

second means to couple said first means to a source of bias potential;

capacitor means coupled to said first means for periodically modifying the conductivity of said first means as a function of the voltage across said capacitor means;

third means to couple said capacitor means to a source of bias potential;

fourth means to couple said capacitor means to a source of bias potential, including electronic means having a control terminal for regulating current flow thorugh said fourth means;

fifth means to couple the control terminal of said electronic means to said first means for operating said electronic means as a function of current flow through said first means; and switch means for periodically discharging said capacitor means.

3. The invention defined in claim 2, wherein said third means comprises resistance means.

4. The invention defined in claim 3, wherein said fourth means comprises the series combination of a resistor and the emitter-collector circuit of a transistor.

5. The invention defined in claim 4, wherein said fifth means comprises second capacitor means.

6. In a deflection system including electromagnetic deflection means for causing an electron beam to sweep the face of a cathode ray tube, an output transistor for regulating current flow to the deflection means;

a driver transistor operatively coupled to said output transistor;

impedance means for coupling said driver transistor means to a point of bias potential;

sweep capacitor means coupled to said driver transistor for providing a ramp-like voltage to said driver transistor;

impedance means for coupling said sweep capacitor means to a point of bias potential, a charging transistor for coupling said sweep capacitor means to a point of bias potential;

second capacitor means connected between said charging transistor and said driver transistor for operating said charging transistor as a function of current flow through said driver transistor; and switch means adapted to receive synchronizing pulses for periodically discharging said sweep capacitor means in response to the presence of said synchronizing pulses.

7. In a cathode ray tube deflection system, circuit means for producing a ramp-like current in the primary winding of a vertical sweep transformer, comprising;

first transistor means, said first transistor means having its emitter-collector circuit coupled in series with the primary winding of the deflection transformer;

second transistor means for applying a control signal to base terminal of said first transistor means;

first resistor means for coupling said second transistor means to a point of bias potential;

first capacitor means coupled to the base terminal of said second transistor;

first charging circuit means for connecting said first capacitor means to a point of bias potential;

second charging circuit means for coupling said first capacitor means to a point of bias potential;

said second charging circuit means including the emitter-collector circuit of a third transistor means;

second capacitor means coupled between the base terminal of said third transistor means and the intersection of said first resistor means and said second transistor means for operating said third transistor means as a function of current flow to said second transistor means; and fourth transistor means for periodically discharging said first capacitor means in response to vertical synchronizing pulses.

8. The invention as defined in claim 7, further including second resistor means connected in series with said third transistor means.

9. The invention as defined in claim 8, further including unidirectional conducting means connected in series with said first capacitor means for providing a constant offset voltage to the base terminal of said second transistor means.

10. The invention as defined in claim 9, further including third and fourth resistor means adapted to be connected in series between a point of biasing potential and a point of common potential, the intersection of said third and said fourth resistor means being connected to the base terminal of said third transistor means.

11. The invention as defined in claim 10, wherein said first and said third resistor means are adjustable.

12. The invention as defined in claim 11, further including fifth resistor means coupled in series between said unidirectional coupling means and said first capacitor means.

* * * * *